United States Patent [19]
Garmaise et al.

[11] Patent Number: 5,678,925
[45] Date of Patent: Oct. 21, 1997

[54] TEMPERATURE SENSING AND INDICATING BEVERAGE MUG

[76] Inventors: Ian Garmaise, 5510 Robinson, Apartment 208, Cote St. Luc, Quebec, Canada, H4V 2P5; David Garmaise, 4910 79th Pl., Kenosha, Wis. 53142

[21] Appl. No.: 543,409

[22] Filed: Oct. 16, 1995

[51] Int. Cl.⁶ ............................ G01K 7/22; G01K 13/12
[52] U.S. Cl. .................... 374/157; 374/150; 374/183; 340/595; 220/703; 206/459.1; 215/11.2
[58] Field of Search ...................... 374/150, 183, 374/141, 157; 340/595; 220/703; 206/459.1; 215/11.2, 387; 229/400

[56] References Cited

U.S. PATENT DOCUMENTS

| | | | |
|---|---|---|---|
| D. 343,129 | 1/1994 | Farley | 374/150 |
| 2,094,520 | 9/1937 | Benamy | 374/150 |
| 2,319,101 | 5/1943 | Anderson | 374/150 |
| 3,135,118 | 6/1964 | Zlobin | 374/141 |
| 3,782,195 | 1/1974 | Meek et al. | 374/150 |
| 4,156,365 | 5/1979 | Heinmets et al. | 374/141 |
| 4,210,024 | 7/1980 | Ishiwatary et al. | 374/171 |
| 4,555,040 | 11/1985 | Butenschon | 374/141 |
| 4,874,253 | 10/1989 | Pompei et al. | 374/121 |
| 5,007,743 | 4/1991 | Brennan | 374/141 |
| 5,133,606 | 7/1992 | Zaragoza et al. | 374/208 |
| 5,211,282 | 5/1993 | Ting | 200/505 |

FOREIGN PATENT DOCUMENTS

| | | | |
|---|---|---|---|
| 1358496 | 3/1964 | France | 374/150 |
| 1560684 | 3/1969 | France | 374/150 |
| 406142061 | 5/1994 | Japan | 128/736 |
| 0011968 | of 1885 | United Kingdom | 374/150 |

OTHER PUBLICATIONS

"Beer Bottled in Mug," Packaging, vol. 3, No. 6, p. 15 (May 1985).

Abstract of FR 2644615 A, published Sep. 1990.

Tandom, V., "Tired of Just Reading Results? Let Your Instruments Do the Talking," Electronic Design, pp. 160–163 (Nov. 22, 1978).

Primary Examiner—Diego F. F. Gutierrez
Attorney, Agent, or Firm—Peter Gibson

[57] ABSTRACT

A hot beverage mug automatically senses the temperature of its liquid contents and generates an accurate aural and/or visual indication of the temperature sensed. The temperature is sensed by a thermistor in a resistive capacitive (R/C) circuit which operates to yield a signal of variable frequency corresponding to the temperature sensed. An integrated circuit (IC) logic controller treats this electrical signal as an input which triggers a further electrical signal from the IC controller to an aural or visual display generating device such as an annunciator, a light emitting diode (LED), liquid crystal display (LCD) or a simulated voice expressing the temperature sensed. The power for the R/C circuit, the IC and the aural/visual indicator(s) is supplied from a battery and controllable by a switch activated either manually or automatically upon sensing the pressure of the liquid contents or by physical contact with the mug handle.

4 Claims, 3 Drawing Sheets

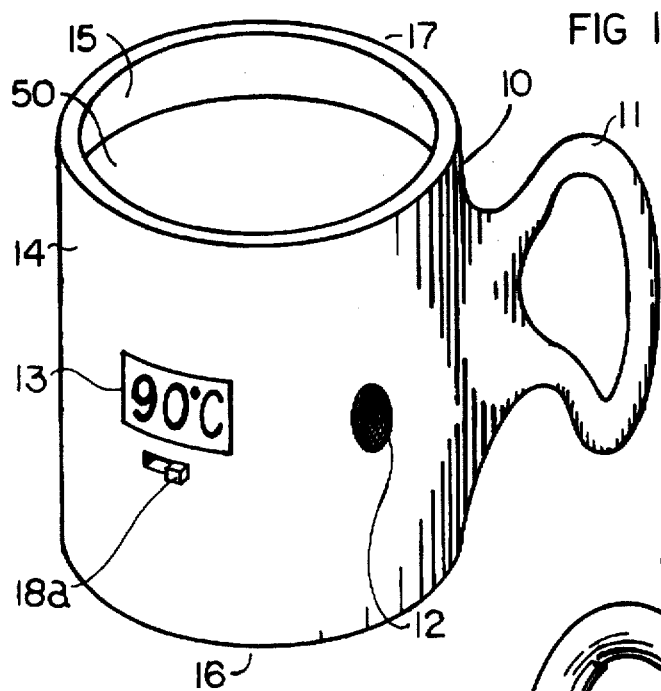
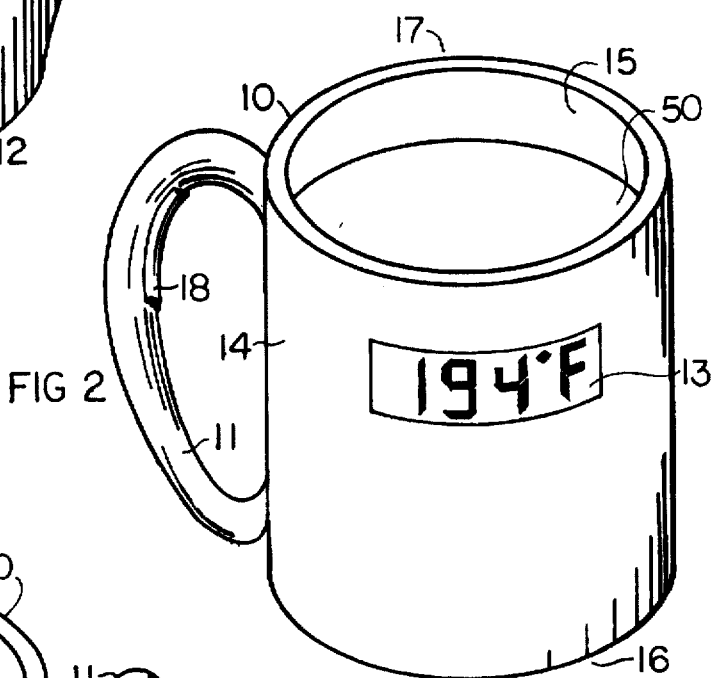
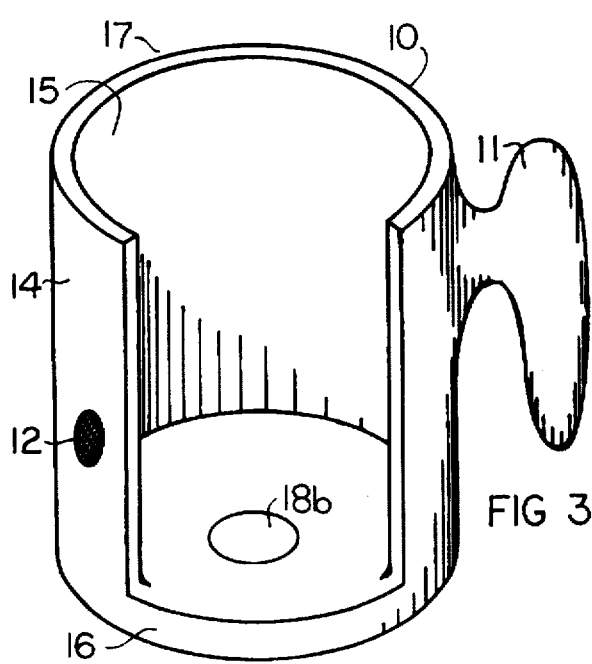

TEMPERATURE SENSING AND INDICATING BEVERAGE MUG

BACKGROUND OF THE INVENTION

1. Field of the Invention

The field of the present invention pertains generally to open mouth drinking vessels, more particularly to open mouth drinking vessels possessing means of indicating a condition of the contents, and most specifically to such drinking vessels further intended for hot beverages possessing a handle and means for sensing the temperature of the liquid contents.

2. General Background

The majority of adults in many countries currently enjoy hot beverages such as tea or coffee every day, indeed, this custom has comprised a quotidian aspect to many cultures for centuries. Hot chocolate flavored milk is another example of a popular beverage which is typically sipped from a cup or mug while quite hot.

The word 'mug' has at least half a dozen meanings in the English language and the word 'cup' has well over a dozen. The first definition of both words is concerned with an open mouth drinking vessel, typically with a handle. Because the word 'mug' generally possesses a narrower meaning and connotes a more definite construction in current usage, including possession of a handle and the intended use in consumption of hot beverages, 'mug' is used throughout this document with this fuller meaning in preference to 'cup'. For the sake of brevity, then, the word 'mug' is understood henceforth as an open mouth drinking vessel possessing a handle further intended for use in the consumption of hot beverages.

The term 'hot' deserves similar consideration. 'Hot' as opposed to 'cold' is a gross relative comparison but serves to characterize the difference between two gross categories of beverages as typically identified in many countries. The preparation of either tea or coffee primarily involves brewing which requires a boiling temperature. Hence, a 'hot beverage' such as tea or coffee often possesses a temperature which is below yet proximate the temperature of boiling water, 75°–100° C., which defines 'hot' as hereinafter employed in association with the word 'beverage'. A 'cold' drink or beverage, alternatively, is typically above but proximate the freezing point of water, particularly if ice is used in preparation or serving. The presence of ice in a beverage provides an assurance that a drink is cold, as understood herein. Similarly, the presence of steam, though wholly dependent upon atmospheric conditions, provides an indication that a given beverage in an open container is hot.

Many people have a strong personal preference for hot tea or coffee or other beverages. If the preference is for a beverage hot enough to visibly steam under typical conditions the beverage imbibed may be hot enough to be scalding which condition is dangerous, as testified to recently in the United States by successful litigation against the purveyor of a scalding hot cup of coffee. Moreover, many people have a preference for a particular temperature range or approximate temperature which is below or proximate the threshold of steaming under typical conditions. In either case, the presence of visible steam is not considered a reliable means of determining the temperature of a hot beverage. Therefore, it is considered that many people who enjoy hot beverages of a relatively particular temperature would benefit from a mug which would accurately indicate the temperature of the beverage held.

Discussion of the Prior Art

Many bottles intended for the feeding of infants and necessarily closed during usage further possess means of indicating the temperature of the contents, indeed, an entire subclass of the U.S. patent classification system is devoted to the subject. A recent example utilizing an LED display is U.S. Pat. No. 4,878,588 issued to Ephraim Nov. 7, 1989 for a 'Baby Nursing Bottle with Temperature Indicator', another example is U.S. Pat. No. 3,125,984 issued to Okuyama Mar. 24, 1964 for a 'Feeding Bottle Capable of Indicating Temperature of Therein Contained Milk for the Unweaned Child'. Many of these patents disclose quite accurate temperature indications, particularly for determining normal body temperature, 37° C.

However, only three instances are known in the prior art of open mouth drinking vessels possessing means of indicating the relative temperature of the contents: U.S. Pat. No. 3,135,118 issued to Zlobin Jun. 2, 1964 for a 'Thermo Cup'; U.S. Pat. No. 3,782,195 issued to Meek et al. Jan. 1, 1974 for a 'Temperature Indicating Vessel'; and U.S. Pat. No. 4,555,040 issued to Butenschon Nov. 26, 1985 for a 'Glass with Stem, Particularly a Wine Glass'.

Zlobin discloses a mug with an internal cavity containing a fluid, such as alcohol, which expands upon heating and causes a whistle and/or a fluid contained in the handle to change color. Meek et al. discloses an open vessel possessing an internal cavity filled with a fluid having a known freezing point which changes state upon filling of the vessel with fluid and indicates the temperature of this fluid relative to the freezing point of the contained fluid, eg. "COLD". Butenschon discloses a goblet possessing an inverted thermometer in the stem, its bulb proximate the bowl of the goblet. The temperature range of the thermometer is in accordance with that preferred of wine: from chilled to room temperature.

Diverse devices, other than beverage drinking vessels, utilizing temperature indicating means for an associated fluid are known as well. U.S. Pat. No. 856,768 issued to Comins Jun. 11, 1907 describes a spoon with an integral thermometer intended for yielding the temperature of a mixture being mixed with the spoon. U.S. Pat. No. 4,408,905 issued to Ehrenkranz Oct. 11, 1983 for a 'Urinary Temperature Measurement Device' discloses a "funnel shaped receptacle" possessing "liquid crystal measurement means" which also "display (the) temperature registration". U.S. Pat. No. 4,509,868 issued to Raconi et al. Apr. 9, 1985 for a 'Temperature Indicating Device for a Cooking Pot and Device-Pot Combination' discloses a covered cooking pot possessing a crystal diode temperature display integral to the lid. U.S. Pat. No. 5,320,137 issued to Huang Jun. 14, 1994 discloses a 'Faucet with Liquid Crystal Temperature Indicator' operating in association with a temperature probe in physical contact with the fluid stream.

Statement of Need

Despite the wide variety of drinking vessels and other diverse devices possessing means of indicating the temperature of an associated fluid, as represented in the above discussion, only one open mouth container intended for a hot beverage is known. The means of indicating the relative temperature of the beverage held relies upon the principle that fluid, gas or liquid, expands with temperature. This yields a crude indication of the temperature, as in the case of a whistle or color change, and fluid trapped in an internal cavity is generally considered problematic in construction of a mug or cup. Although a thermometer yields an accurate indication of temperature, it is not considered desirable to raise a mug full of hot tea or coffee to eye level to read a thermometer incorporated therein, as it might with a wine goblet.

For the purposes of indicating the temperature of a hot beverage held in a mug, it is considered desirable to have an indication which is of sufficient sensitivity to allow the user to determine if the beverage is of a desired temperature according to taste, not merely 'cold' or 'warm' or 'hot' as relative states. It is also considered desirable to have the indication comprehensible from a distance and without any particular orientation required with respect to one's eye level, as in the case of a thermometer. It is therefore considered that a need thus exists for a mug possessing means of accurately indicating the temperature of the beverage contained therein in a manner which requires no special proximity or orientation of the mug with the user.

SUMMARY OF THE INVENTION

Objects of the Invention

The principal object of the present invention is an open mouth drinking vessel possessing a handle and intended for use in imbibing a hot beverage, i.e. a mug, possessing the capability of accurately sensing the temperature of the fluid contained therein, ie. the beverage held, further providing an accurate indication of the temperature sensed which is comprehensible without reading a scale, i.e. patently comprehensible.

An ancillary object of the present invention is a mug possessing the capability of accurately sensing the temperature of the beverage held, further providing an accurate indication of the temperature sensed in a visual form. Another ancillary object of the present invention is a mug possessing the capability of accurately sensing the temperature of the beverage held, further providing an accurate indication of the temperature sensed in an aural form. An auxiliary object of the present invention is a mug possessing the capability of accurately sensing the temperature of the beverage held, further providing an accurate indication of the temperature sensed expressed in either Celsius or Fahrenheit degrees or other unit of temperature.

Other particular objects of the present invention yielding accurate aural indication of the temperature with an annunciator include generation of a simulated human voice, modulation of the aural signal generated by the annunciator dependent upon a sensed temperature in relation to a predetermined temperature varying the presence, volume, frequency and tone of the aural signal produced by the annunciator in accordance with the temperature sensed. Further particular objects of the present invention yield accurate visual indication of the temperature sensed, particularly with LED and LCD graphic displays, and still further objects of the present invention concern pressure and manual switching of the power supplied to the various electronic components utilized in the mug.

Further objects of and benefits deriving from the present invention may become apparent with an understanding of the principles relating to the present invention summarized below applied to achievement of the above stated objects.

Principles Relating to the Present Invention

Sensing of the temperature of the beverage held in a mug in accordance with the principles relating to the present invention is accomplished with a thermistor electrically connected in a resistive/capacitive, i.e. R/C, circuit. A small current passed through this R/C circuit including the thermistor acquires a frequency corresponding to the temperature sensed as the electrical resistance of the thermistor varies with temperature. The R/C circuit is connected to an integrated circuit, i.e. IC, logic controller as an input signal. The IC controller initiates a programmed, ie. predetermined, response in the form of another electric signal in accordance with the signal received from the R/C thermistor circuit.

The electric signal generated by the IC logic controller is received by a device which indicates the temperature sensed. This device varies in accordance with the objects stated above. If the indication is aural, the device will include an annunciator. If the indication is visual, the device will include a graphic display device. Both LCD and LED displays are suggested. It is further suggested that the power supply to the R/C thermistor circuit, the IC logic controller and any other electrical device be switched. Both manual, automatic and various particular forms of switching are further suggested.

A fuller appreciation of the principles relating to the present invention in achievement of the above stated objects, the manner considered best of making and utilizing an embodiment of the same and further aspects of practical consideration with regard to the various desired attributes, methods of use and various constructions may be advanced with a reading of the detailed description below made with reference to the drawings attached hereto.

BRIEF DESCRIPTION OF THE DRAWINGS

FIG. 1 is an isometric representation of a hot beverage mug in accordance with the principles relating to the present invention possessing both aural and visual means of indicating the temperature of the beverage held within the same.

FIG. 2 is an isometric representation of a hot beverage mug in accordance with the principles relating to the present invention possessing only aural means of indicating the temperature of the beverage held within the same.

FIG. 3 is an isometric representation of a hot beverage mug in accordance with the principles relating to the present invention possessing only visual means of indicating the temperature of the beverage held within the same.

DETAILED DESCRIPTION OF THE INVENTION

Figure 4:
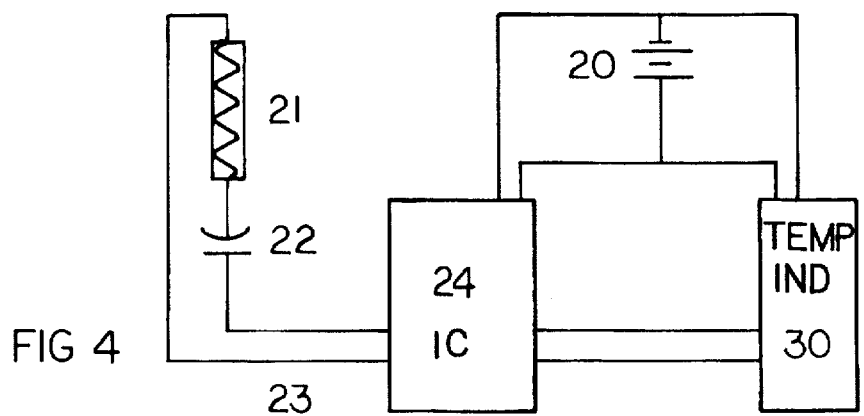
FIG. 4 is a schematic representation of a the sensing, logic control and temperature indication circuitry of a basic embodiment of the principles relating to the present invention.

FIG. 1 depicts a hot beverage mug 10 possessing a handle 11, both aural means 12 and visual means 13 of indicating the temperature of the beverage 50 held by the mug 10. FIG. 2 depicts a similar mug 10 possessing only aural means 12 of indicating the temperature of the beverage 50 held therein. FIG. 3 depicts another similar mug 10 possessing only visual means 12 of indicating the temperature of the beverage 50 held therein. Each mug 10 depicted in FIGS. 1-3 has aural means 12 and/or visual means 13 of indicating temperature incorporated within the exterior surface 14 of the mug 10. Each said mug 10 further possesses an interior surface 15 which is closed at the bottom 16 and open at the top 17.

The mug depicted in FIG. 1 further possesses a manual switch 18a, whereas the mug 10 depicted in FIG. 2 possesses a switch 18 incorporated in the handle 11 and FIG. 3 depicts a mug 10 with a portion cut away to reveal a pressure switch 18b incorporated within the interior surface 15 of the mug 10, preferably upon the bottom 16 as depicted such that the full hydrostatic pressure of the beverage 50 held by the mug 10 is available to trigger the pressure switch 18b. All these switches control the supply of power to electronic components contained by the mug 10 and may be variously used. The manual switch 18a as depicted in FIG. 1, may be employed to control power to certain electronic components, such as the visual display 13, while a pressure switch 18b, such as that depicted in FIG. 3, might activate the other electronic components.

FIG. 4 depicts the electronic components of a basic embodiment of the principles relating to the present invention wherein a thermistor 21 is electrically connected in series with a capacitor 22 to comprise a resistive capacitive, (R/C), circuit 23 which is connected to an integrated circuit, (IC), logic controller 24 as an input. The IC controller 24 is further electrically connected as an input device to a temperature indicator 30, sending it an appropriate signal for indication of the temperature sensed by the R/C circuit 23. The thermistor 21 is disposed proximate the interior surface 15 of the mug 10, preferably towards the bottom 16, for accurate temperature reading of the beverage 50. The battery 20, the thermistor 21, capacitor 22, IC controller 24 and all wiring connections are preferably contained within the mug 10.

Figure 5:
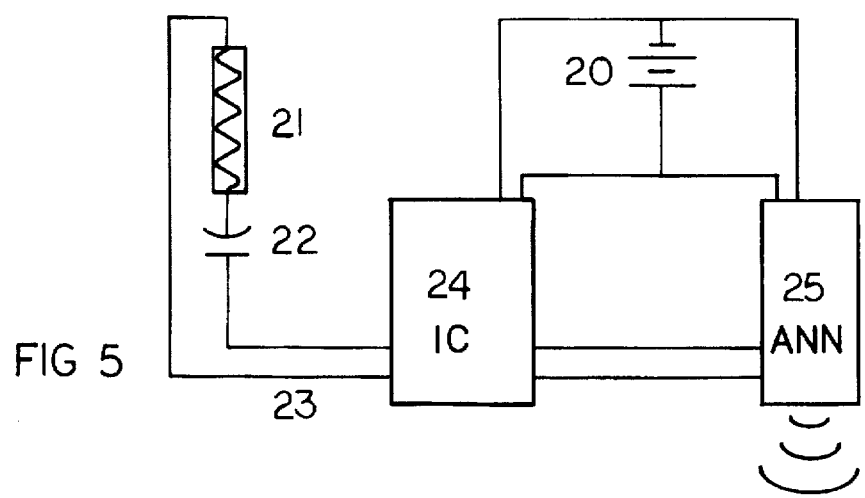
FIG. 5 is a schematic representation of a the sensing, logic control and temperature indication circuitry of an embodiment of the principles relating to the present invention yielding an aural indication of the temperature sensed.

FIG. 5 depicts a schematic similar to that depicted in FIG. 4 wherein aural means 12 of indicating the temperature sensed comprising a simple annunciator 25 electrically connected to the IC controller 24 and the battery 20 such that the signal from the IC controller 24 internally switched by said controller 24 effects the generation of sound waves by the annunciator 25 modulated by the IC controller 24 in accordance with the temperature sensed by the R/C circuit 23. It is considered that the sound produced may be modulated in any fashion to render comprehensible an accurate indication of the temperature sensed. Perhaps the simplest such modulation is a single tone produced by the annunciator 25 at intervals which reflect a frequency corresponding to the temperature sensed. It is recognized that a warning of a scalding hot temperature is desirable and the IC controller 24 can readily modify its signal to the annunciator 25 to reflect this condition. This exemplifies one of a number of cases by which the IC controller 24 can vary the signal annunciated with respect to a predetermined temperature:

| | |
|---|---|
| 1) initiate above; | 9) increase volume above; |
| 2) initiate below; | 10) increase volume below; |
| 3) terminate above; | 11) decrease volume above; |
| 4) terminate below; | 12) decrease volume below; |
| 5) increase frequency above; | 13) raise tone above; |
| 6) increase frequency below; | 14) raise tone below; |
| 7) decrease frequency above; | 15) lower tone above; |
| 8) decrease frequency below; | 16) lower tone below. |

To this list of enumerating the permutations of signal variation in accordance with a predetermined temperature level another form of aural indication is considered below.

Figure 6:
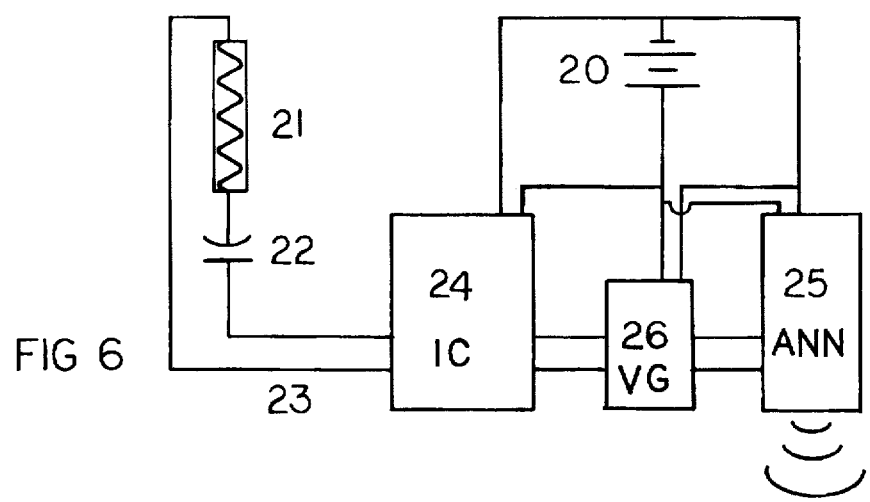
FIG. 6 is a schematic representation of a the sensing, logic control and temperature indication circuitry of an embodiment of the principles relating to the present invention yielding a simulated voice indicating the temperature sensed.

FIG. 6 depicts a schematic similar to the embodiment of the principles relating to the present invention discussed above utilizing an annunciator 25 to which a simulated voice generator 26 is additionally connected electrically to both the annunciator 25 as an input device and to the IC controller 24 as an output device and further possessing a power supply from the battery 20. The ability to have the temperature sensed by the R/C circuit 23 spoken in degrees by the annunciator 25 connected to a simulated voice generator 26 is considered to comprise a preferred aural means 12 of temperature indication. It is further considered that many of the cases listed above for a simple annunciator 25 are applicable to the combination of a voice generator 26 and the annunciator 25. Specifically, it is considered that variation in both tone and frequency are necessary to achieve simulation of a voice, but that cases 1-4 and 9-12 readily apply. Rather than speaking the temperature, or in addition to speaking the temperature, the simulated voice might speak 'Warning, scalding hot' for example.

Figure 7:
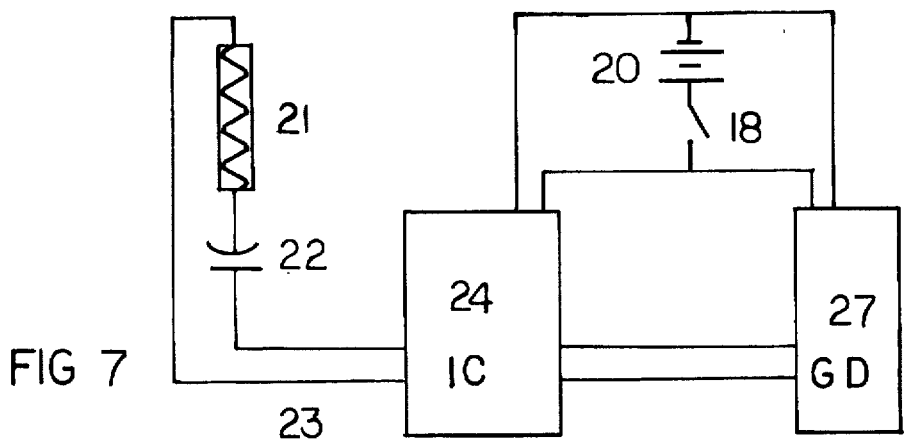
FIG. 7 is a schematic representation of a the sensing, logic control and temperature indication circuitry of an embodiment of the principles relating to the present invention yielding an visual indication of the temperature sensed.
Figure 8:
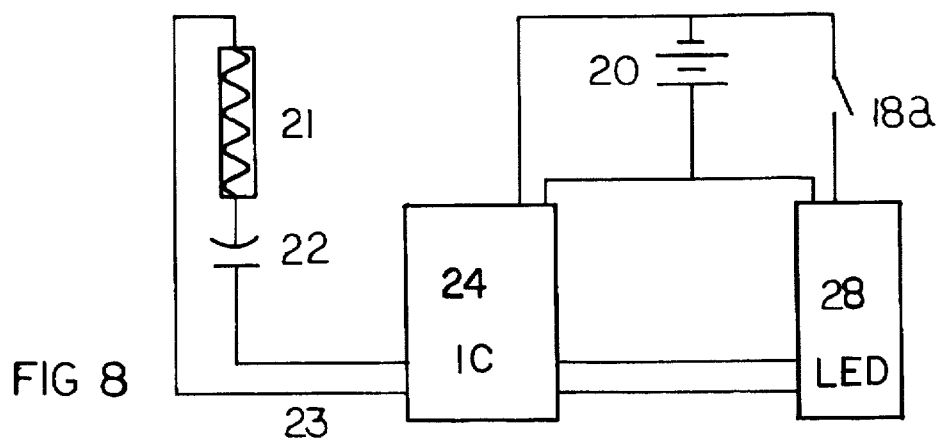
FIG. 8 is a schematic representation of a the sensing, logic control and temperature indication circuitry of an embodiment of the principles relating to the present invention yielding a LED graphic display of the temperature sensed in degrees.
Figure 9:
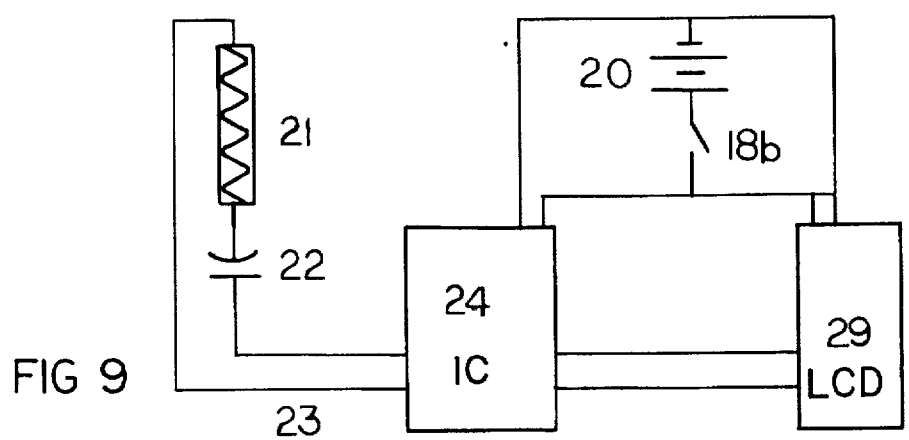
FIG. 9 is a schematic representation of a the sensing, logic control and temperature indication circuitry of an embodiment of the principles relating to the present invention yielding a LCD graphic display of the temperature sensed in degrees.

As opposed to aural means 12 of temperature indication, FIGS. 7-9 are concerned with the visual means 13 of temperature indication as illustrated in FIGS. 1 & 2. FIG. 7 depicts an embodiment of the principles relating to the present invention utilizing an R/C circuit 23 including a thermistor 21 and connected as input to an IC controller as discussed above, having as an output device a graphic display 27. It is primarily intended in this alternate preferred embodiment that the temperature sensed be expressed in degrees, graphically, as opposed to by a simulated voice in the other preferred embodiment. Otherwise, it is considered that the two principal types of screens readily permitting graphic display of a temperature in degrees are light emitting diode, (LED), 28 represented in FIG. 8 and liquid crystal display, (LCD), 29 represented in FIG. 9 comprise specific types of the generic graphic display 27 represented in FIG. 7. The schematics represented in FIGS. 4-6 have the IC logic controller 24 and the temperature indicator 30, or the annunciator 25 and, perhaps, voice generator 26 as all being directly wired to a battery 20. The R/C circuit 23, which includes the thermistor 21 and a capacitor 22, has current through it but this current acts as a signal read by the IC logic controller 24 and is considered to be supplied by the power supplied to the same.

Another consideration concerns switching of the power to the electronic components, including the means of temperature indication 30. FIG. 7 represents an embodiment of the principles relating to the present invention utilizing a generic switch 18 as controlling the power supplied from the battery 20 to all the electronic components utilized. This switch 18 is understood to represent the use of any type, including explicitly manual switches 18a and explicitly automatic pressure switches 18b, as represented in FIGS. 1 & 3. The switch 18 incorporated in the handle 11 of the mug 10 depicted in FIG. 2 shares qualities of both the manual switch 18a depicted in FIG. 1 and the automatic, pressure switch 18b depicted in FIG. 3. The switch 18 depicted in FIG. 2 is operated by the exertion of manual pressure associated with the use of the mug 10. The switching so effected may be considered conscious and therefore manual, or unconscious and therefore automatic.

It is further noted that this switch 18 and the manual switch 18a in FIGS. 1–2 are displaceable and further comprise a portion of the exterior surface 14 of the mug 10. It is considered desirable to have any switch 18 utilized in an embodiment of the principles relating to the present invention sealed with respect to exposure of any electrical connections. A sealed 'push button' type switch is therefore preferred. The manual switch 18a of the type represented in FIG. 1 emphasizes the deliberate aspects of a 'manual' switch 18a as opposed to an 'automatic' switch 18b although the two might be identical in construction and the functional difference between them resulting solely from location: either on the exterior surface 14 and therefore manual or on the interior surface 15 and 'automatic'.

It is also noted that the interior surface 15 and the exterior surface 14 reflects a functional division of one continuous, comprehensive surface about the object comprising the mug 10 which possesses an interior, open cavity intended to contain a hot beverage and an exterior including a handle 11 intended to facilitate the manual required to imbibe the contents without burning one's hands. The electronic components utilized are largely interior to the mug 10 itself which is bounded one, single, comprehensive surface.

FIGS. 8 & 9 represent, respectively, the use of a manual switch 18a and use of an automatic or pressure activated switch 18b. FIG. 8 depicts a manual switch such as that depicted in FIG. 1 as controlling the power from the battery 20 only to the LED screen 28. FIG. 9 depicts an automatic switch 18b such as that depicted in FIG. 3 as switching power from the battery 20 automatically to all the electronic components utilized. These two cases each represent a preferred embodiment of, and together encompass a wide range of switching options all in accordance with, the principles relating to the present invention. It is considered desirable, as depicted in FIG. 9, to have all the electronic components automatically switched to power. A pressure switch 18b, located appropriately, will activate power only when the mug 10 is in use in this preferred example. In another preferred example, as represented in FIG. 8, manual switching of the graphic display 27, specifically an LED 28, which draws more power than an equivalent LCD 29, is considered desirable. And it is considered desirable to have both the R/C circuit 23 and IC controller 24 unswitched, ie. always connected to power, as shown in FIG. 8. This is preferred because the current required to operate these components is relatively small compared with the current required to operate either an annunciator 25 or a graphic display 27. However, these components can be automatically switched from a pressure switch as depicted in FIG. 9, or manually switched as is the LED 28 in FIG. 8.

Many other combinations of switching are recognized in the selection of components to be automatically switched to power, manually switched to power or unswitched, however, the preferred combinations are given in example above along with the reasoning for each. Furthermore, another factor to consider in which switching combination is considered preferable is the size of the battery 20 with regard to power usage of the components in operation and the relative ease and cost of replacement of this battery 20. Further still, it is considered that one battery 20 might be dedicated to some components and another battery 20 dedicated to others. For example, it is considered desirable have both the unswitched R/C circuit 23 and the unswitched IC controller 24 represented in FIG. 8 to be powered by one battery which is relatively expensive and difficult to replace but considerably smaller than another battery which powers the switched temperature indicator.

It is understood that the R/C circuit 23 has a thermistor 21 that varies in electrical resistance in accordance with temperature, a capacitor 22 and acts as an input to the IC controller 24. It is therein assumed that current of a known amount, i.e. predetermined voltage and amperage, will cause the capacitor 22 to charge at a rate which reflects the resistance of the R/C circuit 23, ie. the resistance of the thermistor 21 which varies in accordance with temperature. Two aspects of this have not been fully addressed, however. First, it is noted that the electrical resistance of a thermistor 21 does not vary linearly with respect to temperature. The actual temperature/resistance curves involved over the temperature range addressed must be known and the IC 24 programmed to reflect the same in order for an accurate reading of the temperature to be made using a thermistor 21 in this manner.

Secondly, the method by which the R/C circuit 23 serves as a signal input to the IC controller 24 has not been detailed. There is many ways in which this may be done. However, the best method, i.e. the method which is least expensive in yielding accurate temperature indications with an R/C circuit 23 utilizing a thermistor 21 in conjunction with an IC controller 24, has only one 'pin' connection between the two whereby the input/output relation is alternated continuously, at a rate determined by the length of time required for the capacitor 22 to fully charge and discharge. A connection to ground is provided to the R/C circuit 23 wherein discharge of the capacitance is directly to ground and the current fed through the circuit is through the thermistor 21, thence to the capacitor 22, thence to ground upon discharge. During the charge of the capacitor 21, the connection of the R/C circuit 23 with respect to the IC controller 24 is that of output. With discharge of the capacitor 21, this relation reverses to that of input to the IC controller 24. In this manner, only one pin connection on the IC controller 24 is required for the R/C circuit 23. The logic involved in programming the IC is considered to be well within the scope of one practiced in the art.

Other considerations regarding construction are largely obvious. Mugs in general are often constructed in glazed ceramic which is an excellent material with regard to electrical insulation of the electronic components utilized in a mug 10 in accordance with the principles relating to the present invention. The temperature indicator(s) 30 have a surface comprising a portion of the exterior mug surface 14, a hydrostatic pressure operated 'automatic' switch 18b is located upon the surface of the interior 15 of the mug 10. The thermistor 21 is located to yield an accurate reflection of the hot beverage 50 contained, the battery or batteries 20 are preferably accessible for replacement, but otherwise all the electronic components and any and all necessary associated with the same is preferably encased within the material of which the mug 10 is constructed, bounded by a single, comprehensive surface which is preferably waterproof.

The foregoing is intended to set forth what is considered the best manner of making and using an embodiment in accordance with the principles relating to the present invention and since several manners are considered best for different reasons, various examples are discussed as illustrative of the manifold variations encompassed. Each such example is particularized to illustrate competing objectives and the reasons for various using various forms. None of this discussion may be construed as restrictive in any manner of the scope of the property secured by Letters Patent for which we hereby claim:

1. A mug intended for use in the consumption of hot beverages, said mug comprising:

an open mouth drinking vessel possessing a top, a bottom, an exterior including a handle, an interior closed at the bottom and open at the top, said interior and exterior being bounded by a single comprehensive surface, said open mouth drinking vessel further possessing a plurality of electronic components disposed within said open mouth drinking vessel, between opposed portions of said single comprehensive surface;

said plurality of electronic components comprising a resistive/capacitive (R/C) circuit, an integrated circuit (IC) logic controller, an annunciator, a power supply and switching means;

said R/C circuit including a thermistor and a capacitor, said thermistor varying in electrical resistance in accordance with temperature and disposed proximate said open mouth drinking vessel interior such that the temperature of the thermistor accurately reflects the temperature of said hot beverage;

said R/C circuit and said IC logic controller both being operably connected to said power supply by switching means controlled by exertion of pressure upon a portion of said single comprehensive surface of said open mouth drinking vessel, said annunciator possessing an exterior surface comprising a portion of said exterior of said open mouth drinking vessel and possessing manual switching means to said power supply, whereby, in operation, said annunciator is capable of producing an aural signal;

said IC logic controller being electrically connected to said R/C circuit and to said annunciator whereby a current passed through said R/C circuit acts as an input signal to said IC logic controller in accordance with the temperature sensed by said R/C circuit and said annunciator acts as an output device receiving a signal from said IC logic controller in accordance with said input signal from said R/C circuit;

said signal from said IC logic controller to said annunciator causing said annunciator to accurately produce an aural signal which indicates the temperature sensed by said R/C circuit which accurately reflects the temperature of a hot beverage held by said open mouth drinking vessel.

2. A mug in accordance with claim 1 wherein the volume of said aural signal is modified by said IC logic controller in response to the sensing of a predetermined temperature.

3. A mug in accordance with claim 1 wherein the tone of said aural signal is modified by said IC logic controller in response to the sensing of a predetermined temperature.

4. A mug in accordance with claim 1 wherein the frequency of said aural signal is modified by said IC logic controller in response to the sensing of a predetermined temperature.

* * * * *